Patented Oct. 27, 1953

2,657,217

UNITED STATES PATENT OFFICE 2,657,217

CORROSION INHIBITOR

Herbert E. Morris, Lamarque, Tex., assignor to Monsanto Chemical Company, St. Louis, Mo., a corporation of Delaware No Drawing. Application April 8, 1950, Serial No. 154,876

8 Claims. (Cl. 260—329)

This invention relates to new compositions and deals especially with new, highly efficient corrosion inhibitors and to methods of producing the same. The invention also relates to aqueous solutions containing said compositions.

An object of the invention is to provide improved corrosion inhibitors. Another object of the invention is to provide aqueous solutions of acids or salts having decreased corrosive effects upon metals. Still another object is to provide an easy method for the production of improved corrosion inhibitors from readily obtainable raw materials.

These and other objects hereinafter disclosed are provided by the present invention wherein as new compositions there are prepared hydrolysis products of complexes obtained by reaction of certain hydrocarbons with a metal halide of the Friedel-Crafts catalyst type and thiophene.

The hydrocarbon which is reacted with the metal halide and the thiophene is a normally liquid hydrocarbon selected from the group consisting of saturated aliphatic hydrocarbons having a boiling point of above 49° C., alicyclic hydrocarbons, and aromatic hydrocarbons having attached to the aromatic nucleus at least one alkyl group. Hydrocarbons useful for the production of the present hydrolysis products and having the saturation and the boiling point characteristics noted above include aliphatic, alicyclic, aromatic, and alkylaromatic compounds such as n-hexane, iso-octane, kerosene, cyclohexane, the mono- and poly-alkylated benzenes, e. g., toluene, the xylenes, ethylbenzene, mixtures of polyethylated benzenes, cumene, tert.-butylbenzene, n-amylbenzene, dodecylbenzene and alkylated benzenes obtained by Friedel-Crafts reaction of chlorinated kerosenes with benzene. Aromatic hydrocarbons having attached to the aromatic nucleus an alkyl group of from 1 to 5 carbon atoms are particularly useful. Mixtures of such compounds may be employed as the hydrocarbon component.

Metal halides of the Friedel-Crafts type which are reacted with the hydrocarbon and thiophene include anhydrous aluminum chloride, aluminum bromide, zinc chloride, zinc bromide, ferric chloride, titanium chloride, etc.

The proportions of hydrocarbon, metal halide and thiophene which are used for the preparation of the complexes may be widely varied. Although the complex is probably formed by reaction of molar equivalents of each of the three components, an excess of the hydrocarbon is generally employed, said excess serving as a reaction diluent. Or, if desired, an excess of the thiophene or an excess of both the hydrocarbon and the thiophene may serve as the reaction diluent. Inasmuch as most commonly employed Friedel-Crafts reaction diluents, e. g., nitrobenzene, acetone, etc. are known also to form complexes with the metal halides, it is generally preferred to employ the liquid reaction components as diluents, although non-reactive extraneous solvents may be used. If an excess of the reactants above the stoichiometric proportions for a 1:1:1 molar complex be employed such excess may be readily separated from the complex, e. g., by fractional distillation, solvent extraction, etc.

In preparing the new corrosion inhibitors, I generally prefer to operate substantially as follows:

A mixture of the hydrocarbon, the metal halide and thiophene is brought to refluxing temperature and maintained at that temperature until formation of a complex has been completed. Depending upon the nature of the reactants and the quantities employed, formation of the complex generally requires heating for a time of, say, a few minutes to several hours. Inasmuch as complex formation is accompanied by the accumulation of a tar-like sludge, completion of the reaction may be readily determined by noting the lack of change in the physical appearance of the reaction mixture. The reaction mixture is then allowed to stand in order to permit settling of the sludge, and the liquid layer is decanted. The residue, which is tar-like in nature, may then be hydrolyzed by treating it directly with water; or, if the residue does not permit easy manipulation, it may first be taken up by a solvent such as acetone or ether and hydrolyzed in solution. In any case, the hydrolysis is effected by cautious addition of water. Generally, it is necessary to apply external cooling during the hydrolysis reaction in order to avoid rapid increase of temperature. Upon completion of the hydrolysis, the hydrolyzed mixture is allowed to stand and the resulting water layer separated by decanting. The water layer comprises a dilute solution of hydrogen halide, metal halide, and the present inhibitor. The water layer may be used as such with acids such as aqueous hydrochloric acid in order to lessen the corrosive properties thereof; or it may be concentrated, e. g., by steam distillation to remove a portion of the inhibitor in the distillate, in which oily droplets of the inhibitor become apparent. If desired, these may be separated from the water, for example by extracting with an organic solvent such as ether. The ether may then be removed by distillation, and the oily inhibitor obtained in substantially pure form. For general use with acids such as dilute aqueous hydrochloric acid, the concentrated aqueous product is preferably employed directly, since this eliminates the need of the extracting and final purifying steps.

The procedure given above may be somewhat varied, particularly after the hydrolysis step. In order to obtain optimum yields, repeated water washing of the organic fraction of the hydrolyzed reaction mixture has been found to be advantageous. Also, in order to avoid product loss in decanting, particularly when separating the supernatant liquor from the unhydrolyzed reaction complex, it is advantageous to combine the liquor with the hydrolyzed material in order to decompose by water washing any complex that may have been carried along with the supernatant liquor during the decanting, and then separate the water layer.

While I do not know the exact chemical formula of the hydrolyzed reaction complex, extensive tests of the product show that both the hydrocarbon component and the thiophene are necessary constituents. Thus, complexes prepared from the hydrocarbon and the metal halide in the absence of thiophene do not yield hydrolysis products having very good inhibiting properties, and the hydrolyzed reaction product of thiophene and a metal halide similarly possesses but little corrosion inhibiting properties when employed with dilute aqueous hydrochloric acid solutions.

The invention is further illustrated, but not limited, by the following examples:

Example 1

30 parts by weight of anhydrous aluminum chloride are added to 100 parts by weight of a mixture of polyethylbenzenes, B. P. 136° C. to 300° C. obtained as a by-product in the Friedel-Crafts preparation of ethylbenzene. The aluminum chloride is partially dissolved in the polyethylbenzene and the reaction mixture becomes a reddish brown. 30 parts by weight of thiophene are then gradually added, whereupon all of the aluminum chloride goes into solution, with accompanying evolution of some heat and a change in color from red-brown to black. The whole is then brought to refluxing temperature and maintained at that temperature for a time of 1.5 hours. At the end of that time the reaction mixture is allowed to stand (without stirring) in order to allow the complex to settle. The resulting supernatant layer is then decanted and acetone is added to the almost solid, tarlike residue. The resulting acetone solution of the complex is then combined with the supernatant liquid which had been decanted and 200 parts of water is gradually added, with cooling, to the combined materials. After allowing the mixture to separate into layers, the water layer is separated, and the organic residue is treated with an additional 100 parts of water and the resulting water layer recovered. The combined water layers comprise an aqueous solution of the hydrolyzed polyethylbenzene-aluminum chloride-thiophene complex. Tests of this aqueous solution for corrosion inhibiting properties were made as follows:

A weighed strip of steel of known surface area was kept immersed for a time of 24 hours at 25° C. in an 18 per cent aqueous solution of hydrochloric acid containing 1 per cent by weight of the aqueous solution of hydrolyzed complex obtained as described above. At the end of that time this steel strip was removed from the solution, washed and dried and weighed to determine the loss of metal due to corrosion. When this loss in weight was converted by calculation to "inches of penetration into the metal per year" there was obtained a value of 0.0042 inch. Employing the same testing procedure for the corrosion of a like steel strip in an 18 per cent dilute aqueous hydrochloric acid solution in absence of the present inhibitor was found to be 1.41 inches per year.

Example 2

The aqueous solution of the hydrolyzed polyethylbenzene - aluminum chloride - thiophene complex of Example 1 was tested as an inhibitor for dilute sulfuric acid and for variously diluted phosphoric acid. Employing an amount of the inhibitor of Example 1 equivalent to 0.1 per cent of the acid, and testing for corrosion inhibiting action as in Example 1, the following results were obtained:

| Acid | Corrosion Rate, Inches/Year | |
|---|---|---|
| | Uninhibited | Inhibited |
| 30 percent H$_3$PO$_4$ | 0.0507 | 0.006 |
| 75 percent H$_3$PO$_4$ | 0.3944 | 0.040 |
| 15 percent H$_2$SO$_4$ | 0.2455 | 0.006 |

Example 3

This example shows the corrosion inhibiting effect of the present inhibitor when added to a salt solution. The inhibitor of Example 1 was added to a 15 per cent aqueous solution of aluminum chloride in an amount equivalent to 0.1 per cent of the solution and a steel test specimen was immersed in this solution. Employing the testing procedure described in Example 1, and similarly testing an uninhibited 15 per cent aqueous aluminum chloride solution for purposes of comparison, the following results were obtained:

| Solution | Corrosion Rate, Inches/Year |
|---|---|
| 15 percent AlCl$_3$ soln., uninhibited | 0.009 |
| 15 percent AlCl$_3$ soln., with 0.1 percent inhibitor | 0.0009 |

Example 4

The aqueous solution of the hydrolyzed polyethylbenzene - aluminum chloride - thiophene complex of Example 1 was subjected to steam distillation. As distillation continued oil droplets were apparent in the distillate. The oil was separated from this distillate by ether extraction and the extracted oil was redistilled. The extracted and redistilled oil thus obtained was then tested for its corrosiveness to steel, employing the testing procedure described in Example 1. For purposes of comparison, the uninhibited acid, as well as acid inhibited with commercially available inhibitors of acid corrosion were subjected to the same test at 25° C. The following results were obtained:

| | Penetration of corrosion into steel (inches/year) |
|---|---|
| 18% aq. HCl, uninhibited | 1.41 |
| 18% aq. HCl, inhibited with 0.1% of commercial acid inhibitor A, based on the wt. of the HCl solution | 0.0296 |
| 18% aq. HCl inhibited with 0.1% of commercial acid inhibitor B, based on the wt. of the HCl solution | 0.1209 |
| 18% aq. HCl inhibited with 0.1% of commercial acid inhibitor C, based on the wt. of the HCl solution | 0.257 |
| 18% aq. HCl, inhibited with 0.039% of the hydrolyzed ether extracted, and redistilled complex of this example, based on the wt. of the HCl solution | 0.0086 |

The commercial inhibitors A, B and C employed in these tests are believed to be representative samples of materials in present use for the inhibition of the corrosion of metals in contact with mineral acids.

The remarkable efficiency of the present inhibitor is evident from the fact that the penetration value obtained with it was much less than that obtained with the known inhibitors, even though the quantity of the present inhibitor which was employed in the test amounted to approximately only one third of the quantity of each of the other inhibitors which were tested.

*Example 5*

A mixture consisting of 100 parts of kerosene, 5 parts of aluminum chloride and 5 parts of thiophene was refluxed and subsequently worked up into a hydrolyzed reaction complex as in Example 1. Evaluation of the inhibiting efficiency of the aqueous solution of the hydrolyzed complex, employing hydrochloric acid of 18 per cent strength and a quantity of the aqueous solution equal to 10 per cent by weight of the dilute acid, by the testing procedure of Example 1 gave a value of 0.0028 inch per year.

*Example 6*

A mixture consisting of 100 parts of cyclohexane, 5 parts of aluminum chloride and 5 parts of thiophene was refluxed for approximately one hour. The reaction mixture was allowed to stand, and the resulting clear, supernatant layer was removed. Hydrolysis of the lower layer by treatment with approximately 200 parts of water gave an aqueous solution which was employed as an inhibitor of acid corrosion without further treatment. Evaluation of the inhibiting efficiency of this solution, employing hydrochloric acid of 18 per cent strength and a quantity of the present solution equal to 10 per cent by weight of the dilute acid, by the testing procedure of Example 1 gave a value of 0.0063 inch per year.

*Example 7*

Operating as in Example 6, but substituting commercial xylene for the cyclohexane of Example 6, a value of 0.0083 inch per year was obtained.

*Example 8*

In order to show that high inhibiting efficiency is the property of only the hydrolyzed ternary complexes, i. e., complexes prepared from a hydrocarbon, aluminum chloride and thiophene rather than from any two of these components, the following pairs of reactants, in equal parts by weight, were subjected to the reaction conditions of Example 6 and hydrolyzed as in that example. A 5 per cent solution of aluminum chloride was also prepared by dissolving 1 g. of anhydrous aluminum chloride in 20 ml. of water. Tests of the corrosion inhibiting properties using the procedure as in Example 1 gave the following values for the indicated components:

| Reactants | Penetration of corrosion into steel, inch/year |
|---|---|
| Thiophene+AlCl₃ | 0.326 |
| Polyethylbenzene (of Ex. 1)+AlCl₃ | 0.333 |
| Polyethylbenzene (of Ex. 1)+Thiophene | 0.456 |
| 5% Aqueous solution of aluminum chloride | 0.512 |

Accordingly, the hydrocarbon, the metal halide and the thiophene must be employed to yield highly effective inhibitors.

The present inhibitors are advantageously employed with any mineral acid solutions of varying concentrations. Mineral acids which may be inhibited by addition of the present inhibitor thereto are in addition to hydrochloric acid, sulfuric acid, phosphoric acid, etc. In order to show comparable data, the tests described above were all made with hydrochloric acid of 18 per cent strength; however, the great potency of the present products, particularly that of the solvent extracted and redistilled oils, recommends them for use with strong acid solutions, such as those employed in removing deposits which have accumulated in steam boilers. Aqueous solutions of the hydrolyzed complexes are advantageously used in inhibiting the more dilute acids, for example those used in acidizing oil wells. The inhibitors may be used alone with the acids or they may be employed with surface-active agents, demulsifiers, acid-intensifiers, etc.

What I claim is:

1. The process of preparing compositions for inhibiting aqueous mineral acid solutions against corrosiveness to metals which comprises reacting a mixture of approximately equimolecular proportions of a normally liquid aromatic hydrocarbon having attached to the aromatic nucleus at least one alkyl group of at least one to five carbon atoms, thiophene, and a Friedel-Crafts metal halide catalyst by boiling under reflux conditions and hydrolyzing the tar-like complex thus formed.

2. The process of preparing compositions for inhibiting aqueous mineral acid solutions against corrosiveness to metals which comprises reacting a mixture of approximately equimolecular proportions of a polyethylbenzene hydrocarbon, thiophene, and aluminum chloride by boiling under reflux conditions, and hydrolyzing the tar-like complex thus formed.

3. The process of preparing compositions for inhibiting aqueous mineral acid solutions against corrosiveness to metals which comprises reacting a mixture of approximately equimolecular proportions of a polyethylbenzene hydrocarbon, thiophene, and aluminum chloride by boiling under reflux conditions, separating the tar-like complex thus formed from the reaction mixture, treating said complex with water to hydrolyze it, and removing at least a portion of water from the hydrolyzed complex.

4. The process of preparing compositions for inhibiting aqueous mineral acid solutions against corrosiveness to metals which comprises reacting a mixture of approximately equimolecular proportions of a polyethylbenzene hydrocarbon, thiophene, and aluminum chloride by boiling under reflux conditions, separating the tar-like complex thus formed from the reaction mixture, treating said complex with water to hydrolyze it, steam-distilling the hydrolyzed complex until oil appears in the distillate, and separating said oil.

5. The hydrolysis product obtained by reacting a mixture of approximately equimolecular proportions of a normally liquid aromatic hydrocarbon having attached to the aromatic nucleus at least one alkyl group of at least one to five carbon atoms, thiophene, and a Friedel-Crafts metal halide catalyst by boiling under reflux conditions and hydrolyzing the tar-like complex thus formed.

6. The hydrolysis product obtained by reacting a mixture of approximately equimolecular proportions of a polyethylbenzene hydrocarbon, thiophene, and aluminum chloride by boiling under reflux conditions, and hydrolyzing the tar-like complex thus formed.

7. The partially dehydrated hydrolysis product obtained by reacting a mixture of approximately equimolecular proportions of a polyethylbenzene hydrocarbon, thiophene, and aluminum chloride by boiling under reflux conditions, separating the tar-like complex thus formed from the reaction mixture, treating said complex with water to hydrolyze it, and removing at least a portion of water from the hydrolyzed complex.

8. The oily product obtained by reacting a mixture of approximately equimolecular proportions of a polyethylbenzene hydrocarbon, thiophene, and aluminum chloride by boiling under reflux conditions, separating the tar-like complex thus formed from the reaction mixture, treating said complex with water to hydrolyze it, steam-distilling the hydrolyzed complex until oil appears in the distillate, and separating said oil.

HERBERT E. MORRIS.

References Cited in the file of this patent

UNITED STATES PATENTS

| Number | Name | Date |
|---|---|---|
| 2,160,293 | Shoemaker et al. | May 30, 1939 |
| 2,311,189 | Peterson | Feb. 16, 1943 |
| 2,380,254 | McCulloch | July 10, 1945 |
| 2,413,260 | Soday | Dec. 24, 1946 |
| 2,480,831 | Brooks | Sept. 6, 1949 |
| 2,489,674 | Rittshausen | Nov. 29, 1949 |
| 2,490,270 | Johnson | Dec. 6, 1949 |
| 2,502,390 | Reiff | Mar. 28, 1950 |
| 2,515,928 | Lukasiewicz | July 18, 1950 |